United States Patent
Naito et al.

(10) Patent No.: US 9,601,277 B2
(45) Date of Patent: Mar. 21, 2017

(54) METHOD FOR MANUFACTURING CAPACITOR ELEMENT

(71) Applicant: SHOWA DENKO K.K., Tokyo (JP)

(72) Inventors: Kazumi Naito, Tokyo (JP); Shoji Yabe, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 109 days.

(21) Appl. No.: 14/401,585

(22) PCT Filed: May 17, 2013

(86) PCT No.: PCT/JP2013/063798
§ 371 (c)(1),
(2) Date: Nov. 17, 2014

(87) PCT Pub. No.: WO2013/172453
PCT Pub. Date: Nov. 21, 2013

(65) Prior Publication Data
US 2015/0162136 A1  Jun. 11, 2015

(30) Foreign Application Priority Data
May 18, 2012  (JP) ................................. 2012-115035

(51) Int. Cl.
| | | |
|---|---|---|
| H01G 9/042 | (2006.01) | |
| H01G 9/052 | (2006.01) | |
| H01G 9/15 | (2006.01) | |
| B22F 3/10 | (2006.01) | |
| B22F 5/00 | (2006.01) | |
| H01G 9/00 | (2006.01) | |

(52) U.S. Cl.
CPC ............. *H01G 9/042* (2013.01); *B22F 3/10* (2013.01); *B22F 5/00* (2013.01); *H01G 9/0036* (2013.01); *H01G 9/052* (2013.01); *H01G 9/0525* (2013.01); *H01G 9/15* (2013.01); *H01G 9/0032* (2013.01)

(58) Field of Classification Search
CPC .......... H01G 9/015; H01G 9/42; H01G 9/052; H01G 9/035
See application file for complete search history.

(56) References Cited

U.S. PATENT DOCUMENTS

| | | | |
|---|---|---|---|
| 6,876,083 B2 | 4/2005 | Yano et al. | |
| 2004/0016978 A1 | 1/2004 | Yano et al. | |
| 2011/0232056 A1 | 9/2011 | Hayashi et al. | |
| 2013/0277626 A1* | 10/2013 | Naito .................... | B22F 1/0096 252/515 |
| 2014/0294663 A1 | 10/2014 | Naito et al. | |

FOREIGN PATENT DOCUMENTS

| | | |
|---|---|---|
| JP | 2003-272959 A | 9/2003 |
| JP | 2004-349658 A | 12/2004 |
| JP | 2010-123494 A | 6/2010 |
| JP | 2011-124118 A | 6/2011 |
| JP | 5222438 B1 | 6/2013 |
| WO | 2004/055843 A1 | 7/2004 |
| WO | 2006/089222 A2 | 8/2006 |
| WO | 2012/086272 A1 | 6/2012 |

OTHER PUBLICATIONS

International Search Report for PCT/JP2013/063798 dated Jul. 23, 2013.
Communication dated Mar. 7, 2016 from the European Patent Office issued in corresponding Application No. 13790139.3.

* cited by examiner

Primary Examiner — Nguyen Ha
(74) Attorney, Agent, or Firm — Sughrue Mion, PLLC

(57) ABSTRACT

The present invention provides an anode body for capacitors, which is formed of a sintered body that is obtained by sintering a powder mixture of a tungsten powder and a tungsten trioxide powder, and wherein the ratio of the tungsten trioxide powder to the total amount of the tungsten powder and the tungsten trioxide powder is 1 to 13 mass %. The present invention is able to reduce the number of semiconductor layer formation wherein polymerization of a semiconductor precursor is carried out a plurality of times on a dielectric layer. Consequently, a solid electrolytic capacitor element, in which a semiconductor layer that is composed of a conductive polymer is formed on a dielectric layer that is formed on the outer surface layer and the inner surface layer of the fine pores of a tungsten sintered body, can be produced efficiently.

15 Claims, No Drawings

METHOD FOR MANUFACTURING CAPACITOR ELEMENT

CROSS REFERENCE TO RELATED APPLICATIONS

This application is a National Stage of International Application No. PCT/JP2013/063798 filed May 17, 2013, claiming priority based on Japanese Patent Application No. 2012-115035 filed May 18, 2012, the contents of all of which are incorporated herein by reference in their entirety.

TECHNICAL FIELD

The present invention relates to an anode body of a capacitor comprising a sintered body obtained by sintering tungsten powder, the method of manufacturing the same, a capacitor element using the anode body, the method of manufacturing thereof and a capacitor having the capacitor element.

BACKGROUND ART

With the progress of small-size, high-speed and light-weight electronic devices such as cellular phones and personal computers, the capacitor used for these electronic devices is demanded to have a smaller size, a larger capacitance and a lower equivalent series resistance (ESR).

An electrolytic capacitor is composed of a conductor (an anode body) as one electrode, a dielectric body formed in the surface layer of the electrode, and the other electrode (semiconductor layer) provided thereon. As an example of such a capacitor, an electrolytic capacitor has been proposed, which capacitor is produced by anodically oxidizing an anode body for capacitors comprising a sintered body made of a valve-acting metal powder which can be anodized such as tantalum to form a dielectric layer made of the oxide of the metal on an inner layer of fine pores and on the outer surface layer of the electrode, polymerizing a semiconductor precursor (monomer for conductive polymer) on the dielectric layer to form a semiconductor layer comprising a conductive polymer, and forming an electrode layer on a predetermined part on the semiconductor layer.

The electrolytic capacitor using tungsten as a valve-acting metal and employing the sintered body of the tungsten powder as an anode body can attain a larger capacitance compared to the electrolytic capacitor obtained with the same formation voltage by employing the anode body of the same volume using the tantalum powder having the same particle diameter. However, the electrolytic capacitor having the sintered body of the tungsten powder has been unpracticed as an electrolytic capacitor due to the large leakage current (LC). In order to solve this issue, a capacitor using the alloy of tungsten and other metals has been studied and has achieved some improvement in the leakage current, but it was not enough (JP-A-2004-349658 (U.S. Pat. No. 6,876, 083 B2); Patent Document 1).

Patent Document 2 (JP-A-2003-272959) discloses a capacitor using an electrode of a tungsten foil having formed thereon a dielectric layer selected from $WO_3$, $W_2N$ and $WN_2$, but the capacitor is not to solve the above-mentioned leakage current problem.

Also, Patent Document 3 (WO 2004/055843 (U.S. Pat. No. 7,154,743 B2)) discloses an electrolytic capacitor using an anode selected from tantalum, niobium, titanium and tungsten, but it does not describe a specific example using tungsten in the specification.

As a tungsten powder which can solve the leakage current (LC) problem in the electrolytic capacitor using as an anode body comprising a sintered body of the tungsten powder, the present inventors have invented a tungsten powder, a part of the surface of which is made to be tungsten silicide so as to make the powder have a silicon content within a specific range, an anode body of the capacitor made by sintering the tungsten powder, and an electrolytic capacitor using the anode body as an electrode (WO 2012/086272).

PRIOR ART

Patent Document

Patent Document 1: JP-A-2004-349658
Patent Document 2: JP-A-2003-272959
Patent Document 3: WO 2004/055843

DISCLOSURE OF THE INVENTION

Problems to be Solved by the Invention

In the method of manufacturing a solid electrolytic capacitor element comprising steps of: forming a dielectric layer on an inner surface layer of fine pores and on the outer surface layer of the sintered body made by molding and sintering tungsten powder, conducting polymerization on the dielectric layer to form a semiconductor layer comprising a conductive polymer, and forming an electrode layer on the semiconductor layer; there is a problem that the semiconductor precursor (monomer) does not sufficiently penetrate into fine pores of the dielectric layer formed on the tungsten sintered body, and the semiconductor layer is not always sufficiently formed.

A specific example of the semiconductor forming the semiconductor layer includes various conductive polymers obtained by polymerizing a semiconductor precursor (for example, at least one kind selected from monomer compounds having pyrrol, thiophene or aniline skeleton, and the derivatives thereof) and doping the polymer with a dopant. In the case where these conductive polymers are used, the semiconductor layer which is formed by one polymerization reaction is usually short in thickness. Thus, it is required to conduct polymerization reactions a plurality of times to obtain a semiconductor layer having a desired thickness. Further, the dielectric layer formed on the tungsten sintered body is different from the dielectric layer of tantalum or niobium in that the semiconductor precursor does not sufficiently penetrate into fine pores in the dielectric layer, and does not necessarily spread deeply into the fine pores. Accordingly, it is necessary to increase the number of polymerization reactions until a desired semiconductor layer is formed so as to make the semiconductor layer have a desired thickness.

Accordingly, an object of the present invention is to provide a method of manufacturing a solid electrolytic capacitor element in which a semiconductor layer comprising a conductive polymer having a desired thickness can be efficiently formed on the dielectric layer formed on the inner surface layer of pores and on the outer surface layer of a tungsten sintered body.

Means to Solve the Problem

As a result of intensive studies to solve the above problem, the present inventors have found that the number of the step for forming a semiconductor layer on the dielectric layer can be decreased by using a sintered body made of mixed powder in which tungsten trioxide ($WO_3$) powder in a predetermined amount is mixed with tungsten powder to thereby efficiently form a semiconductor layer having a desired thickness, and accomplished the present invention.

That is, the present invention provides a method of manufacturing a capacitor element as described below.

[1] A method for manufacturing an anode body of a capacitor comprising, obtaining a tungsten sintered body is obtained by sintering mixed powder of the tungsten powder and the tungsten trioxide powder, wherein the ratio of the tungsten trioxide powder with respect to the total amount of the tungsten powder and the tungsten trioxide powder falls within the range of 1 to 13 mass %.

[2] The method of manufacturing an anode body according to [1] above, wherein the tungsten powder contains at least one element selected from silicon, oxygen, nitrogen, carbon, boron and phosphorus.

[3] The method of manufacturing an anode body according to [2] above, wherein the silicon element exists as tungsten silicide on at least part of the surface of tungsten powder.

[4] The method of manufacturing an anode body according to [2] or [3] above, wherein the content of the silicon element in the tungsten powder is 0.05 to 7 mass %.

[5] The method of manufacturing an anode body according to any one of [2] to [4] above, wherein the content of the oxygen element in the tungsten powder is 0.05 to 8 mass %.

[6] The method of manufacturing an anode body according to any one of [2] to [5] above, wherein the content of phosphorus element in the tungsten powder is 1 to 500 mass ppm.

[7] The method of manufacturing an anode body according to any one of [1] to [5] above, wherein the content of nitrogen element in the anode body is 0.01 to 0.5 mass %.

[8] The method of manufacturing an anode body according to any one of [1] to [6] above, wherein the content of the carbon element in the anode body is 0.001 to 0.1 mass %.

[9] The method of manufacturing an anode body according to any one of [1] to [7] above, wherein the boron content in the anode body is 0.001 to 0.1 mass %.

[10] The method of manufacturing an anode body according to any one of [2] to [4] above, comprising an operation of incorporating at least one element selected from nitrogen, carbon and boron in the tungsten powder so that the anode body has any of the nitrogen element content of 0.01 to 0.5 mass %, carbon element content of 0.001 to 0.1 mass % or boron element content of 0.001 to 0.1 mass %.

[11] The method of manufacturing an anode body according to any one of [1] to [10] above, wherein each amount of impurity elements other than silicon, nitrogen, carbon, boron, oxygen and phosphorus is 1,000 mass ppm or less.

[12] A method of manufacturing a capacitor element comprising a step of forming an anode body by the method according to [1] to [11] above, forming a dielectric layer on the surface of the anode body, conducting polymerization on the dielectric layer to polymerize a precursor which becomes a conductive polymer by the polymerization to thereby form a semiconductor layer, and forming an electrode layer on the semiconductor layer.

[13] An anode body of a capacitor comprising a tungsten sintered body made by sintering mixed powder of tungsten powder and tungsten trioxide powder, and the ratio of the tungsten trioxide powder with respect to the total amount of the tungsten powder and the tungsten trioxide powder is 1 to 13 mass %.

[14] A capacitor element having the anode body according to [13] above.

[15] A capacitor having the capacitor element according to [14] above.

Effects of the Invention

By using the sintered body of the mixed powder of tungsten powder and tungsten trioxide powder (in the mixed powder, the ratio of the tungsten trioxide powder with respect to the total amount of the tungsten powder and the tungsten trioxide powder is 1 to 13 mass %) as an anode body, it is possible to decrease the number of the step for forming semiconductor layers in which polymerization of semiconductor precursor is conducted a plurality of times on a dielectric layer. Accordingly, using the present invention, a high-capacitance solid electrolytic capacitor using a capacitor element obtained by forming a dielectric layer on an inner surface layer of fine pores and an outer surface layer of the tungsten sintering body, forming a semiconductor layer thereon, further forming an electrode layer on a predetermined part of the semiconductor layer serially can be accomplished at a low cost.

MODE FOR CARRYING OUT THE INVENTION

In the manufacturing method of an anode body of the present invention, as a material powder of a sintered body to be used as an anode body, for example, mixed powder of tungsten powder and tungsten trioxide powder can be used, in which mixed powder the ratio of the tungsten trioxide powder is 1 to 13 mass % to the total amount of the tungsten powder and the tungsten trioxide powder.

The sintered body obtained by sintering tungsten composition powder containing tungsten trioxide powder in the above-mentioned range in the mixed powder is improved in penetrating property of the semiconductor precursor (for example, monomer for conductive polymer) to a dielectric layer formed on an inner surface layer of fine pores and an outer surface layer of the sintered body. Thus, a semiconductor layer comprising conductive polymer having a desired thickness can be formed by a fewer number of polymerization reactions. When the content of tungsten trioxide powder in the mixed powder is less than 1 mass %, the powder has less effect. When the content exceeds 13 mass %, a capacity of the manufactured solid electrolytic capacitor decreases significantly, which is not desirable.

The tungsten powder and the tungsten trioxide powder used in the present invention are commercially available. As a material tungsten powder, tungsten powder having a still smaller particle diameter which is more preferable can be obtained by, for example, pulverizing the tungsten trioxide powder under hydrogen atmosphere; or reducing the tungstic acid, salt thereof (ammonium tungstate and the like) and tungsten halide using a reducing agent such as hydrogen and sodium, and appropriately selecting the reducing conditions. Also, the tungsten powder can be obtained by reducing the tungsten-containing mineral directly or through several steps and by selecting the reducing conditions.

The tungsten powder used in the present invention may be the granulated one as mentioned below (hereinafter, when tungsten powders are classified based on whether they are granulated or not, the ungranulated tungsten powder and the granulated powder are referred to as the "primary powder" and the "granulated powder", respectively.) Further, tungsten powder used in the present invention may contain silicon, oxygen, nitrogen, carbon, boron, phosphorus and various other elements. Particularly, the tungsten powder in which the silicon element exists as tungsten silicide on a part of the surface of the tungsten powder is preferably used.

The tungsten powder in which a part of the particle surface is silicified can be obtained by, for example, mixing the silicon powder well into the tungsten powder and allowing the mixture to react by heating generally at a temperature of 1,100 C.° or higher and 2,600 C.° or lower under reduced pressure of $10^{-1}$ Pa or less. In the case of using this method, the silicon powder reacts with the tungsten from the surface of the tungsten particles and tungsten silicide such as $W_5Si_3$ is formed and localized generally within 50 nm from the surface layer of the tungsten particles. Hence, the core of the primary particles remains as a highly-conducting metal, which suppresses the equal serial resistance of the anode body produced using the tungsten powder, which is preferable. The tungsten silicide content can be adjusted by the silicon amount to be added. The silicon content of the tungsten powder of the present invention is preferably 7 mass % or less, more preferably 0.05 to 7 mass %, and particularly preferably 0.2 to 4 mass %. The tungsten powder containing silicon within the above-mentioned range is a preferable powder for use in the electrolytic capacitors, imparting better LC characteristics to the capacitors.

As an example of the method for allowing nitrogen element to be contained in tungsten powder, there is a method of placing the tungsten powder at 350 to 1,500° C. under reduced pressure (generally 1 Pa or less) of a nitrogen gas atmosphere for from one minute to ten hours.

Nitrogen element may be incorporated in a sintered body material or a sintered body later at any time in each of a stage to obtain the mixed power or a stage to obtain a sintered body under the similar conditions as in the case of incorporating nitrogen in tungsten powder. Thus, the timing of adding nitrogen element is not specified but it is preferable to add nitrogen element in an early stage of the production process. Addition of nitrogen element can prevent excessive oxidation of the powder when the powder is handled in air.

As the content of nitrogen element, it is preferable to allow nitrogen element to remain in the anode body in an amount of 0.01 to 0.5 mass %, more preferably 0.05 to 0.3 mass %. Among tungsten powders, when nitrogen element is added to the primary powder, for example, the content of nitrogen element of the primary powder may be adjusted to about the same amount to twofold amount of the target nitrogen content in the anode body as a measure. That is, a preliminary test is to be performed to adjust the content of nitrogen element of the primary powder within a range of 0.01 to 1 mass % so as to attain the above-mentioned preferable nitrogen content as an anode body.

In the above-mentioned nitrogen element content, not only the nitrogen bonded to tungsten but also the nitrogen having no chemical bond with tungsten (e.g. nitrogen forming a solid solution) is included.

As an example of the method of allowing carbon element to be incorporated in tungsten powder, there is a method of placing the tungsten powder at 300 to 1,500° C. under reduced pressure (usually $10^3$ Pa or less) in a high temperature vacuum furnace using carbon electrodes for from one minute to ten hours. The carbon element content can be adjusted by selecting the temperature and period of time. It is preferable to add the carbon element so as to make the carbon element content in the obtained sintered body be 0.001 to 0.1 mass %, more preferably to 0.01 to 0.1 mass %. The timing of adding carbon element is the same as the above-mentioned timing of adding nitrogen element. However, since carbon remains in the anode body in a high yield, the carbon content can be adjusted within the above-mentioned range whenever the carbon element is added. When the nitrogen gas is introduced into the furnace with carbon electrodes under predetermined conditions, carbon element and nitrogen element can be added simultaneously, which enables the production of the tungsten powder containing nitrogen element and carbon element.

As an example of the method for allowing boron element to be contained in tungsten powder, there is a method of placing the boron element or a boron-containing compound as a boron source when granulating the tungsten powder. It is preferable to add the boron source so that the boron content in the obtained anode body may be preferably 0.001 to 0.1 mass %, more preferably 0.01 to 0.1 mass %. Good LC characteristics can be attained when the boron content is within the above-mentioned range. When powder containing each element of silicon, nitrogen or carbon is put into a furnace having carbon electrodes, with a boron source placed in the furnace, and is granulated, it is possible to produce a tungsten powder containing each combination of elements of silicon and boron, nitrogen and boron, or carbon and boron. When the boron element is added in a predetermined amount, the LC characteristics are further improved in some cases.

The content of oxygen element in the tungsten powder is preferably 0.05 to 8 mass %, and more preferably 0.08 to 1 mass %.

As a method for controlling the content of oxygen element to 0.05 to 8 mass %, nitrogen gas containing oxygen is introduced when the powder is taken out from a high temperature vacuum furnace at the time of performing a step of adding any element among silicon, nitrogen, carbon or boron to tungsten powder, as mentioned above. In case that the temperature at the time of being taken out from the high temperature vacuum furnace is lower than 280° C., oxidation takes priority over introduction of nitrogen element to tungsten powder. By feeding the gas gradually, a predetermined oxygen element content can be obtained. By making each of the tungsten powders have a predetermined oxygen element content in advance, it is possible to reduce the deterioration due to the irregular excessive oxidation during the subsequent processes for producing anode bodies for electrolytic capacitors using the powder. In cases where the oxygen element content is within the above-mentioned range, the LC characteristics of the produced electrolytic capacitors can be kept better. In the case when nitrogen is not introduced in this process, an inert gas such as argon and helium may be used instead of the nitrogen gas.

The phosphorus element content of the tungsten powder is preferably from 1 to 500 mass ppm.

As an example of the methods for incorporating the phosphorus element in an amount of 1 to 500 mass ppm in the tungsten powder in which at least a part of the surface is silicified and at least one element of nitrogen, carbon, boron or oxygen is further incorporated, there is a method of producing a powder containing phosphorus element by placing phosphorous or a phosphorus compound in a high temperature vacuum furnace as a phosphorus source at the time of producing a primary powder or a granulated powder of each tungsten powder. It is preferable to incorporate phosphorus in the tungsten powder so as to make the phosphorus content within the above-mentioned range by controlling the amount of the phosphorus source and the like because the physical breakdown strength of the anode bodies produced thereof can be improved in some cases.

When the phosphorus content falls within the range, LC characteristics of the manufactured electrolytic capacitor are further improved.

To attain better LC characteristics, it is preferable to keep the content of each of impurity elements in the anode body other than each element of tungsten, silicon, nitrogen, carbon, boron, oxygen and phosphorus to 1,000 mass ppm or lower. In order to keep the content of these elements to the above-mentioned value or lower, the amount of the impurity elements contained in the raw materials, pulverizing member to be used, containers and the like should be closely examined.

The tungsten powder may be in a form of granulated powder. Granulated powder is preferable due to its good flowability and easy operability for molding or the like. The granulated powder further may the one in which the fine pore distribution is adjusted in the manner as JP-A-2003-213302 (EP 1388870) discloses on the case of a niobium powder.

The granulated powder can also be obtained by adding at least one member of the liquid such as water and liquid resin to the primary powder so as to be made into the granules having an appropriate size; and sintering the granules by heating under reduced pressure. The reduced-pressure condition to obtain easy-handling granulated granules (for example, at 1 kPa or less under non-oxygen gas atmosphere such as hydrogen) and the high temperature standing condition (for example, from 1,100° C. to 2,600° C. for 0.1 to 100 hours) can be determined by a preliminary experiment. If there are no agglomerations of the granules with each other after the sintering, there is no need for pulverization.

Such granulated powder can be classified by a sieve into particles of a similar diameter. The average particle size within a range of preferably 50 to 200 μm, more preferably 100 to 200 μm, is suitable because the powder can smoothly flow from the hopper of the molding machine to a mold.

The tungsten primary powder having an average primary particle diameter of 0.1 to 1 μm, preferably 0.1 to 0.3 μm can increase the capacitance of the electrolytic capacitor, particularly when the capacitor is produced from the granulated powder thereof.

When obtaining such a granulated powder, it is favorable to make the granulated powder so as to have a specific surface area (by BET method) of preferably 0.2 to 20 m$^2$/g, more preferably 1.5 to 20 m$^2$/g, by controlling the above-mentioned primary particle diameter because it can further increase the capacitance of the electrolytic capacitor.

There is no limitation regarding a method and a timing for mixing tungsten trioxide powder to tungsten powder, and it is preferable to adopt a method and a timing which enable uniform mixing as much as possible.

Separately prepared tungsten trioxide may be mixed in tungsten powder. Alternatively, by changing a condition to produce tungsten powder by reducing tungsten trioxide or ammonium tungstate with hydrogen to leave a part of tungsten trioxide unreacted, tungsten powder and tungsten trioxide powder can be obtained simultaneously and mixed with each other.

Regarding the timing of mixing, it is preferable to mix tungsten trioxide powder in a primary powder of tungsten powder and granulate them to make a granule in which tungsten powder and tungsten trioxide powder are mixed. However, they may be mixed at a different stage. For example, tungsten trioxide may be mixed in tungsten granulated powder. Generally, a binder such as acrylic resin is further mixed to the mixed powder of tungsten powder and tungsten trioxide powder, and the resultant is molded and sintered, but tungsten trioxide powder may be mixed at the same time of mixing the above-mentioned binder. As mentioned above, tungsten trioxide powder may be mixed not at one time but in several batches at any time of each step as long as the final amount of mixing is right.

In the present invention, a sintered body of the above-mentioned mixed powder in which tungsten trioxide is mixed is used as an anode body of a capacitor, a dielectric layer is formed on the surface of the anode body, and a semiconductor layer is formed on the dielectric layer. For forming a semiconductor layer, for example, a semiconductor precursor (at least one kind selected from a monomer compound having a pyrrol, thiophene or aniline skeleton and various derivatives thereof) is subjected to multiple polymerization reactions to form a semiconductor layer comprising a conductive polymer and having a desired thickness. The anode body, on which a dielectric layer and a semiconductor layer are sequentially formed by the method may be used as a capacitor element as it is. Preferably, an electrode layer comprising a carbon layer and a silver layer being sequentially laminated on the above-mentioned semiconductor layer is provided on the semiconductor layer to form a capacitor element in order to improve electric contact with an external lead (e.g. lead frame).

EXAMPLES

The present invention is described below by referring to Examples and Comparative Examples, but the present invention is not limited thereto.

In the present invention, the measurement of the particle diameter and the specific surface area and elemental analysis were carried out by the methods described below.

The particle diameter was measured by using HRA9320-X100 manufactured by Microtrac Inc. and the particle size distribution was measured by the laser diffraction scattering method. A particle size value ($D_{50}$; μm) when the accumulated volume % corresponded to 50 volume % was designated as the average particle size. The diameter of the particles including the secondary particles is to be measured by this method. However, since a primary powder generally has good dispersibility and has virtually no secondary particle, the average particle diameter of the primary powder measured by the above measuring equipment can be viewed as substantially the same as an average primary particle diameter.

The specific surface area was measured by the BET method by using NOVA2000E (manufactured by SYSMEX).

For the elemental analysis, ICP emission spectrometry was performed by using ICPS-8000E manufactured by Shimadzu Corporation.

Example 1

A powder of tungsten having an average particle diameter of 0.7 μm (range of particle diameter: 0.07 to 8 μm) and a BET specific surface area of 3.7 m$^2$/g was obtained by reducing ammonium tungstate with hydrogen. Into the powder, 1 mass % of commercially-available tungsten trioxide ($WO_3$) powder was mixed, put into a vacuum heating furnace, left to stand under $10^{-1}$ Pa at 1,400° C. for 30 minutes, and cooled to room temperature. The solid product was pulverized by using a hammer mill, and a granule powder having an average particle diameter of 110 μm and particle diameter within the range of 20 to 170 μm was obtained to be used in the following experiments.

A granulated powder was molded in which a tungsten wire having a diameter of 0.40 mmØ was implanted, put in a vacuum heating furnace and sintered under $10^{-1}$ Pa at 1,490° C. for 30 minutes to manufacture a sintered body having a size of 3×1.5×4.5 mm (the wire is implanted in the 3×1.5 mm face, 10 mm of which protrudes outside and 3 mm of which is inserted inside the sintered body) to be an anode body.

Subsequently, the wire of the sintered body is connected into every other part of a connecting sockets in a jig described in Example 1 of WO 2010/107011 publication (EP 2410541A), and a dielectric layer was formed by chemical conversion in 0.1 mass % of nitric acid solution at 10° C. for 8 hours at a current density of 2 mA/piece initially, and 10 V of constant voltage later.

The sintered body on which a dielectric layer was formed was immersed in an ethanol solution of 5 mass % 3,4-ethylenedioxythiophene (hereinafter, referred to as "EDTH), dried at room temperature, dipped in a separately-prepared alcohol solution of 10 mass % naphthalenesulfonic acid iron, pulled up and reacted at 60° C. for 10 minutes. The series of the operations was repeated for 5 times to obtain a treated body.

Next, a semiconductor layer comprising a conductive polymer was formed by electrolytic polymerization as follows. The treated body was immersed in 20 mass % EDTH ethanol solution, impregnated in a container made of stainless steel (SUS303) filled with separately prepared polymerization solution (EDTH and anthraquinone sulfonic acid were added to a solvent containing 30 parts by mass of water and 70 parts by mass of ethylene glycol so that the solution contains 0.4 mass % of EDTH and 0.6 mass % of anthraquinone sulfonic acid) to the depth that the whole sintered body was immersed, and electrolytic polymerization was performed at 20° C. and 25 µA for 45 minutes. After pulled up from the solution, the sintered body was washed with water, washed with ethanol and dried.

The step of impregnation in 20 mass % EDTH ethanol solution, electrolytic polymerization and post chemical conversion as mentioned above was repeated another 11 times (total 12 times). The current values of the electrolytic polymerization were set at 30 µA for the first time, 35 µA for the second time, 50 µA for the third to seventh times and 55 µA for the eighth to twelfth times. A carbon layer and a silver paste layer were sequentially laminated on a predetermined part of thus obtained semiconductor layer, and an electrode layer was formed to thereby manufacture 32 pieces of the solid electrolytic capacitor elements.

Comparative Example 1

A sintered body was manufactured as in a similar manner to that of Example 1 except that the granulated powder having an average particle diameter of 110 µm and a particle diameter range of 20 to 170 µm was prepared without mixing the tungsten trioxide ($WO_3$) powder in the tungsten powder, the subsequent operations were also conducted as in a similar manner to that of Example 1, the step of impregnation into 20 mass % EDTH ethanol solution, electrolytic polymerization and post chemical conversion was repeated 12 times to form a semiconductor layer, an electrode layer was formed by laminating a carbon layer and a silver paste layer sequentially on a predetermined part of the semiconductor layer, to thereby manufacture a solid electrolytic capacitor element.

Comparative Example 2

A solid electrolytic capacitor element was manufactured as in the same manner to that of Comparative Example 1 except that the step of impregnation into 20 mass % of EDTH ethanol solution, electrolytic polymerization and post chemical conversion was repeated for 17 times to form a semiconductor layer.

The capacitance of the solid electrolytic capacitor elements manufactured in Example 1 and Comparative Examples 1 and 2 were measured, and the results were obtained as shown in Table 1. The capacitance at room temperature, 120 Hz and bias voltage of 2.5 V was measured by using an LCR meter manufactured by Agilent. The value was measured three minutes after the element was taken out from a 105° C. dryer and the average value of 32 pieces of the elements is shown in the table.

TABLE 1

| | $Wo_3$ amount/ (W amount + $Wo_3$ amount) (mass %) | Number of repetition (n times) | Capacitance (µF) |
|---|---|---|---|
| Example 1 | 1 | 12 | 1100 |
| Comparative Example 1 | 0 | 12 | 685 |
| Comparative Example 2 | 0 | 17 | 1100 |

Examples 2 to 5 and Comparative Examples 3 to 4

Tungsten powder having an average particle diameter of 0.7 µm (range of particle diameter: 0.07 to 8 µm) and BET specific surface area of 3.7 m$^2$/g obtained by reducing ammonium tungstate with hydrogen as in Example 1 was used. To this powder, 3 to 13 mass % (Examples 2 to 5) and 15 to 20 mass % (Comparative Examples 3 and 4) of commercially-available tungsten trioxide ($WO_3$) powder was respectively mixed as in Table 2. The resultant was put in a vacuum heating furnace to stand under $10^{-1}$ Pa and at 1,400° C. for 30 minutes, and returned to room temperature. The solid product was pulverized with a hammer mill to obtain a granulated powder having an average particle diameter of 110 µm and a range of particle diameter of 20 to 170 µm. 32 pieces of the solid electrolytic capacitor elements were manufactured from the granulated powder of each Example in the same manner as Example 1. The capacitance of solid electrolytic capacitor manufactured in each Example was measured by using an LCR meter manufactured by Agilent at room temperature, 120 Hz and bias voltage of 2.5 V. The value was measured three minutes after the element was taken out from a 105° C. dryer. The results (average value of 32 elements) and the results of Example 1 are shown together in Table 2.

TABLE 2

| | $Wo_3$ amount/ (W amount + $Wo_3$ amount) (mass %) | Number of repetition (n times) | Capacitance (µF) |
|---|---|---|---|
| Example 1 | 1 | 12 | 1100 |
| Example 2 | 3 | 12 | 1100 |
| Example 3 | 7 | 12 | 1080 |
| Example 4 | 10 | 12 | 1005 |
| Example 5 | 13 | 12 | 940 |
| Comparative Example 3 | 15 | 12 | 770 |
| Comparative Example 4 | 20 | 12 | 700 |

Tables 1 and 2 clearly show that use of a sintered body of mixed powder in which 1 to 13 mass % of tungsten trioxide ($WO_3$) powder is mixed in tungsten powder can decrease the number of the step for forming a semiconductor layer, in which polymerization of a semiconductor precursor on a dielectric layer is conducted a plurality of times, compared to the case of using a sintered body of tungsten powder without $WO_3$ being mixed, while the almost same capacitance can be obtained.

Example 6

Mixed powder of 0.5 mass % of commercially-available silicon powder having an average particle diameter of 1 µm and tungsten powder having an average particle diameter of 1 µm (range of the particle diameter: 0.1 to 12 µm) and BET specific surface area of 1.2 $m^2/g$ obtained by reducing tungsten trioxide ($WO_3$) powder with hydrogen was used instead of the tungsten powder of Example 1. 32 pieces of the capacitor element were manufactured as in a similar manner to that of Examples 1 to 5 except that mixed powder in which 1 mass % of commercially-available tungsten trioxide ($WO_3$) powder was mixed to the above powder was used, the repetition number of electrolytic polymerization was eight times, and the current value was set to 40 µA for the first time, 45 µA for the second time and 60 µA for the third to eighth times.

Comparative Example 5

A capacitor element was manufactured as in a similar manner to that of Example 6 by repeating the step of impregnation in 20 mass % EDTH ethanol solution, electrolytic polymerization and post chemical conversion eight times except that the tungsten trioxide ($WO_3$) powder was not mixed into the silicon-containing tungsten powder.

Comparative Example 6

A capacitor element was manufactured as in the same manner as Comparative Example 5 except that the step of impregnation to 20 mass % of EDTH ethanol solution, electrolytic polymerization and post chemical conversion was repeated 12 times to form a semiconductor layer.

The capacitance of the solid electrolytic capacitor elements manufactured in Example 6 and Comparative Examples 5 and 6 was measured by using an LCR meter manufactured by Agilent at room temperature, 120 Hz and bias voltage of 2.5 V. The value was measured three minutes after the element was taken out from a 105° C. dryer. The results (average value of 32 elements) are shown in Table 3.

TABLE 3

| | $Wo_3$ amount/ (W amount + $Wo_3$ amount) (mass %) | Number of repetition (n times) | Capacitance (µF) |
|---|---|---|---|
| Example 6 | 1 | 8 | 845 |
| Comparative Example 5 | 0 | 8 | 630 |
| Comparative Example 6 | 0 | 12 | 835 |

Examples 7 to 10 and Comparative Examples 7 to 8

The powder in which the same commercially-available silicon powder as the one used in Example 6 was mixed in an amount of 0.5 mass % was used, and commercially-available tungsten trioxide ($WO_3$) powder was mixed in the powder in varying amounts of 3 to 13 mass % (Examples 7 to 10) and 15 to 20 mass % (Examples 7 and 8). Thereafter, a capacitor element was manufactured as in a similar manner to that of Example 6. The capacitance of the solid electrolytic capacitor element manufactured in each Example was measured by using an LCR meter manufactured by Agilent at room temperature, 120 Hz and bias voltage of 2.5 V. The value was measured three minutes after the element was taken out from a 105° C. dryer. The results (average value of 32 elements) and are shown in Table 4 together with the results of Example 6.

| | $Wo_3$ amount/ (W amount + $Wo_3$ amount) (mass %) | Number of repetition (n times) | Capacitance (µF) |
|---|---|---|---|
| Example 6 | 1 | 8 | 845 |
| Example 7 | 3 | 8 | 840 |
| Example 8 | 7 | 8 | 825 |
| Example 9 | 10 | 8 | 805 |
| Example 10 | 13 | 8 | 790 |
| Comparative Example 7 | 15 | 8 | 655 |
| Comparative Example 8 | 20 | 8 | 630 |

Tables 3 and 4 show that by using a sintered body of mixed powder in which 1 to 13 mass % of tungsten trioxide ($WO_3$) powder is mixed in tungsten powder, the number of forming a semiconductor layer can be decreased compared to the case of using a sintered body of tungsten powder without $WO_3$ being mixed, while the same capacitance can be obtained.

INDUSTRIAL APPLICABILITY

According to the present invention, a high-capacitance solid electrolytic capacitor using a capacitor element can be realized at a low cost, in which element a dielectric layer is formed on the surface of an anode body, a semiconductor layer is formed on the dielectric layer and further, an electrode layer is formed on a predetermined part of the semiconductor layer on the outer layer.

The invention claimed is:

1. A method for manufacturing an anode body of a capacitor comprising, obtaining a tungsten sintered body by sintering a mixed powder of a tungsten powder and a tungsten trioxide powder, wherein the ratio of the tungsten trioxide powder with respect to the total amount of the tungsten powder and the tungsten trioxide powder falls within the range of 1 to 13 mass %.

2. The method of manufacturing an anode body according to claim 1, wherein the tungsten powder contains at least one element selected from silicon, oxygen, nitrogen, carbon, boron and phosphorus.

3. The method of manufacturing an anode body according to claim 2, wherein the silicon element exists as tungsten silicide on at least part of the surface of tungsten powder.

4. The method of manufacturing an anode body according to claim 2, wherein the content of the silicon element in the tungsten powder is 0.05 to 7 mass %.

5. The method of manufacturing an anode body according to claim 2, wherein the content of the oxygen element in the tungsten powder is 0.05 to 8 mass %.

6. The method of manufacturing an anode body according to claim 2, wherein the content of phosphorus element in the tungsten powder is 1 to 500 mass ppm.

7. The method of manufacturing an anode body according to claim 2, comprising an operation of incorporating at least one element selected from nitrogen, carbon and boron in the tungsten powder so that the anode body has any of the nitrogen element content of 0.01 to 0.5 mass %, carbon element content of 0.001 to 0.1 mass % or boron element content of 0.001 to 0.1 mass %.

8. The method of manufacturing an anode body according to claim 1, wherein the content of nitrogen element in the anode body is 0.01 to 0.5 mass %.

9. The method of manufacturing an anode body according to claim 1, wherein the content of the carbon element in the anode body is 0.001 to 0.1 mass %.

10. The method of manufacturing an anode body according to claim 1, wherein the boron content in the anode body is 0.001 to 0.1 mass %.

11. The method of manufacturing an anode body according to claim 1, wherein each amount of impurity elements other than silicon, nitrogen, carbon, boron, oxygen and phosphorus is 1,000 mass ppm or less.

12. A method of manufacturing a capacitor element comprising a step of forming an anode body by the method according to claim 1, forming a dielectric layer on the surface of the anode body, conducting polymerization on the dielectric layer to polymerize a precursor which becomes a conductive polymer by the polymerization to thereby form a semiconductor layer, and forming an electrode layer on the semiconductor layer.

13. An anode body of a capacitor comprising a tungsten sintered body made by sintering mixed powder of tungsten powder and tungsten trioxide powder, and the ratio of the tungsten trioxide powder with respect to the total amount of the tungsten powder and the tungsten trioxide powder is 1 to 13 mass %.

14. A capacitor element having the anode body according to claim 13.

15. A capacitor having the capacitor element according to claim 14.

* * * * *